(12) United States Patent
Hamasaki (10) Patent No.: US 7,265,785 B2
(45) Date of Patent: Sep. 4, 2007

(54) IMAGING APPARATUS AND METHOD THAT PROVIDE HIGH RESOLUTION UNDER LOW ILLUMINATION WITHOUT SUBSTANTIAL S/N DEGRADATION

(75) Inventor: Takeshi Hamasaki, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 602 days.

(21) Appl. No.: 10/496,697

(22) PCT Filed: Jul. 24, 2003

(86) PCT No.: PCT/JP03/09363

§ 371 (c)(1),
(2), (4) Date: May 26, 2004

(87) PCT Pub. No.: WO2004/012444

PCT Pub. Date: Feb. 5, 2004

(65) Prior Publication Data

US 2005/0062861 A1    Mar. 24, 2005

(30) Foreign Application Priority Data

Jul. 25, 2002    (JP) ............................. 2002-216331

(51) Int. Cl.
*H04N 5/235* (2006.01)
*H04N 9/64* (2006.01)
*H04N 1/46* (2006.01)
*G06K 9/40* (2006.01)

(52) U.S. Cl. .................. 348/242; 348/229.1; 358/532; 382/264

(58) Field of Classification Search ............ 348/216.1, 348/229.1, 230.1, 242, 254, 255, 265, 234; 358/532, 463; 382/264, 275
See application file for complete search history.

(56) References Cited

U.S. PATENT DOCUMENTS 5,420,633 A * 5/1995 Matoba ...................... 348/242

(Continued)

FOREIGN PATENT DOCUMENTS

JP    06-113318 A    4/1994

(Continued)

OTHER PUBLICATIONS

International Search Report corresponding to application No. PCT/JP03/009363 dated Dec. 2, 2003.

*Primary Examiner*—John M. Villecco
(74) *Attorney, Agent, or Firm*—RatnerPrestia (57) ABSTRACT

An imaging apparatus provides minimal S/N degradation with a high resolution at low illumination. The imaging apparatus includes a CCD, a gain adjusting section, an LPF for performing smoothing on an output signal of the gain adjusting section, and a control section and a selecting section selecting for outputting either the output signal or the LPF according to a magnitude of gain of the gain adjusting section. Also included are a three-dimensional NR for performing recursive noise reduction, a detail extracting section, and an adder that enhance a two-dimensional high-frequency component of an output signal of the three-dimensional NR. The control and selecting sections perform the selection to provide the output signal of the gain adjusting section to the three-dimensional NR when the gain of the gain adjusting section is equal to or lower than a predetermined value. Otherwise, the output of the LPF is provided to the three-dimensional NR.

12 Claims, 11 Drawing Sheets

U.S. PATENT DOCUMENTS

| | | | |
|---|---|---|---|
| 5,552,824 | A * | 9/1996 | DeAngelis et al. ...... 348/222.1 |
| 5,614,948 | A * | 3/1997 | Hannah ...................... 348/255 |
| 6,088,057 | A * | 7/2000 | Hieda ...................... 348/229.1 |
| 6,456,325 | B1 * | 9/2002 | Hayashi ...................... 348/234 |
| 6,518,998 | B1 * | 2/2003 | Christoff et al. ......... 348/216.1 |
| 6,724,943 | B2 * | 4/2004 | Tsuchiya et al. ............ 382/264 |
| 6,750,907 | B1 * | 6/2004 | Sube ...................... 348/229.1 |
| 7,098,945 | B1 * | 8/2006 | Sasai et al. .................. 348/234 |
| 7,129,976 | B2 * | 10/2006 | Jaspers ...................... 348/241 |
| 7,136,095 | B2 * | 11/2006 | Patej ...................... 348/229.1 |

FOREIGN PATENT DOCUMENTS

| | | |
|---|---|---|
| JP | 11-308486 A | 11/1999 |
| JP | 2001185969 A * | 7/2001 |

* cited by examiner

IMAGING APPARATUS AND METHOD THAT PROVIDE HIGH RESOLUTION UNDER LOW ILLUMINATION WITHOUT SUBSTANTIAL S/N DEGRADATION

This application is U.S. National Phase Application of PCT International Application PCT/JP03/09363.

TECHNICAL FIELD

The present invention relates to an imaging apparatus such as a digital video camera and an imaging method.

The present invention relates to an imaging apparatus such as a digital video camera.

BACKGROUND ART

Recently CCDs have been reduced in pixel size as video cameras become smaller and CCDs have more pixels. CCDs smaller in pixel size are reduced in sensitivity and S/N as a natural result. Particularly it becomes difficult to secure picture quality at low illumination. Hence, noise reduction is essential to the latest video cameras.

Figure 5:
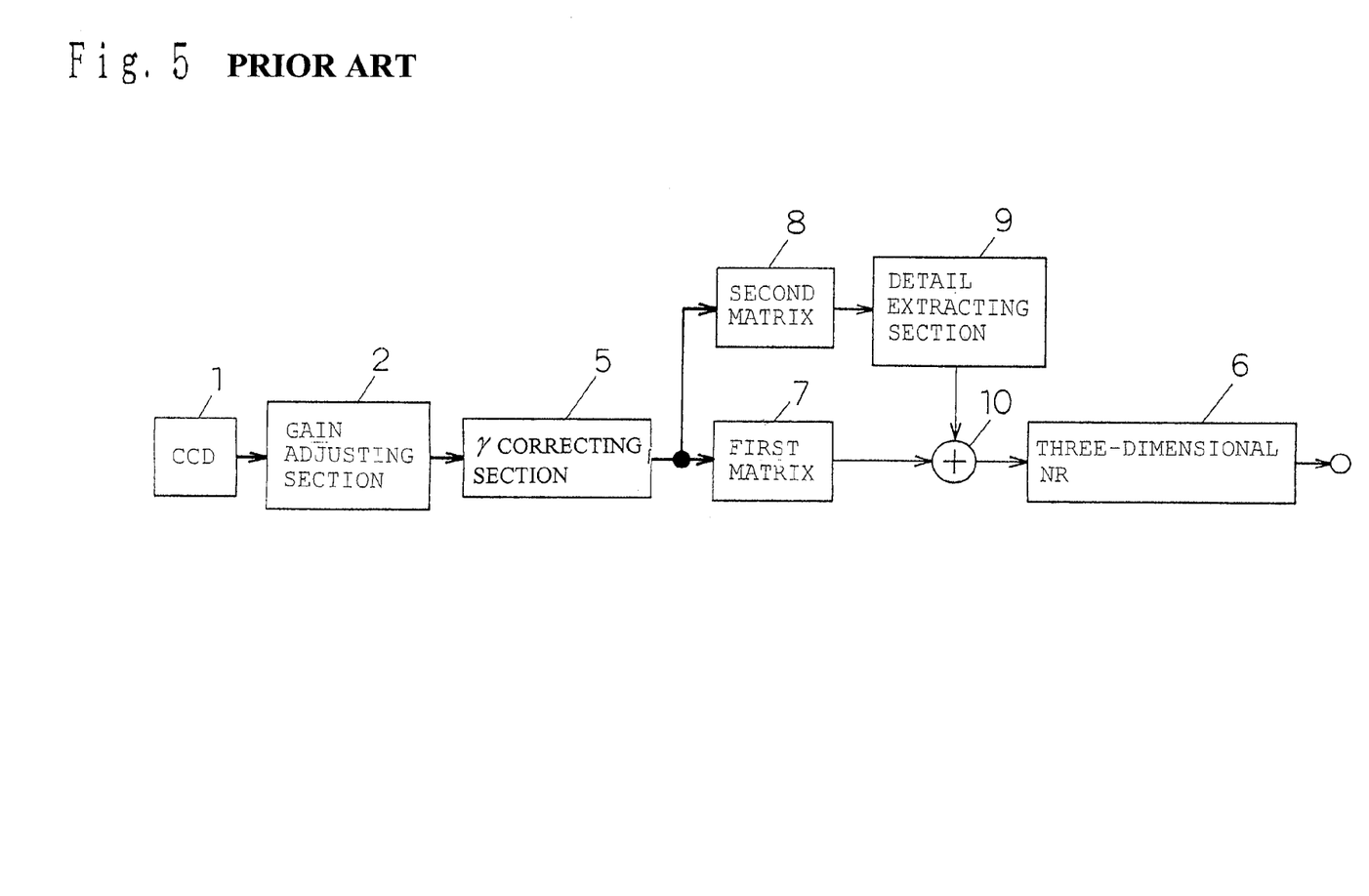
FIG. 5 is a block diagram showing a structural example of a conventional imaging apparatus.

The configuration of a conventional imaging apparatus will be described below. A structural example of the conventional imaging apparatus is illustrated in FIG. 5. FIG. 5 shows an example of a 3CCD camera which has a CCD 1 composed of three CCDs corresponding to RGB signals, respectively. Three RGB systems are present from the CCD 1 to a γ correcting section 5. To simplify the drawing, thick arrows represent RGB signals and thin arrows represent luminance signals in FIG. 5. The output of the CCD 1 is subjected to proper gain control and proper tone correction according to subject conditions in a gain adjusting section 2 and the γ correcting section 5.

Incidentally, images taken by a video camera decrease in resolution because of high frequency components which are degraded by the characteristic of a lens, the number of pixels constituting the CCD 1, and an aperture ratio of a pixel. Thus, operations of increasing a resolution are performed in a first matrix 7, a second matrix 8, a detail extracting section 9, and an adder 10.

In the first matrix 7, a first luminance signal γ is determined from an RGB signal by the operation of (Formula 1) below.

$Y=0.30R+0.59G+0.11B$ (Formula 1)

In the second matrix 8, a second luminance signal Y' is determined from an RGB signal by the operation of (Formula 1) or (Formula 2).

$Y'=0.25R+0.50G+0.25B$ (Formula 2)

The reason why Y' is determined in addition to Y is that in the 3CCD camera when a spatial pixel shift method is used, in which a CCD for G is shifted by a half pixel pitch from CCDs for RB, a loop component for G and a loop component for RB are canceled that are inverted in phase in a frequency region. In this case, the coefficients of RGB in the operation of (Formula 2) are set in such a way that the coefficient of G is 0.5 and the sum of the coefficients of R and B is 0.5.

Figure 6:
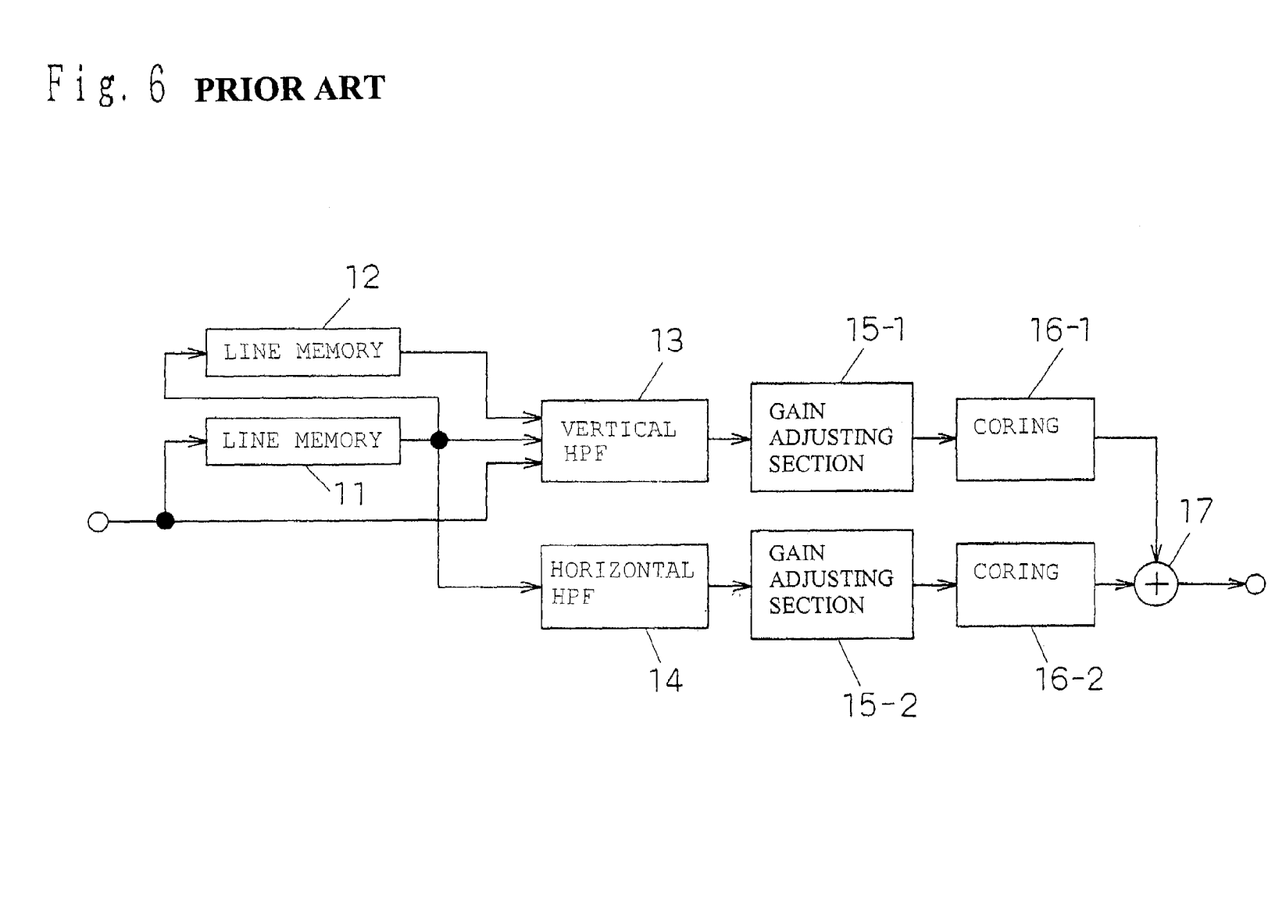
FIG. 6 is a block diagram showing the configuration of detail extracting means.

In the detail extracting section 9, the two-dimensional high frequency component of the second luminance signal is extracted. The second luminance signal serves as the output of the second matrix 8. FIG. 6 shows an example of the internal configuration of the detail extracting section 9. FIG. 7 shows the signal wave form of each part. The waveforms of FIG. 7 indicate vertical and horizontal changes. The following explanation will be made in accordance with FIGS. 6 and 7.

In line memories 11 and 12, an inputted video signal is delayed by 1H (H: horizontal scanning period which is about 63.5 μsec in the NTSC). The output of the line memory 11 is inputted to the line memory 12. As a result, the outputs of the line memories 11 and 12 are equivalent to input signals delayed by 1H and 2H. In a vertical HPF (High Pass Filter) 13, a high frequency component Hv in the vertical direction is determined by the operation of (Formula 3).

$Hv=(-1+2\cdot H^{-1}-H^{-2})/4$ (Formula 3)

$H^{-1}$ represents a delay of 1H. Similarly in a horizontal HPF 14, a high frequency component $H_H$ in the horizontal direction is determined by the operation of (Formula 4).

$H_H=(-1+2\cdot Z^{-1}-Z^{-2})/4$ (Formula 4)

Figure 7A:
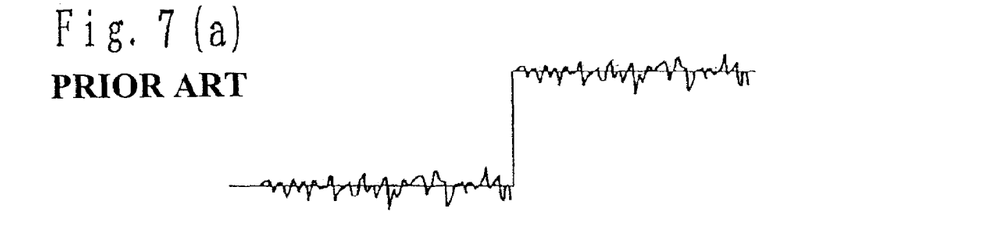
FIG. 7(a)-(d) are schematic diagram explaining operations performed in the detail extracting means in the conventional imaging apparatus.
Figure 7B:
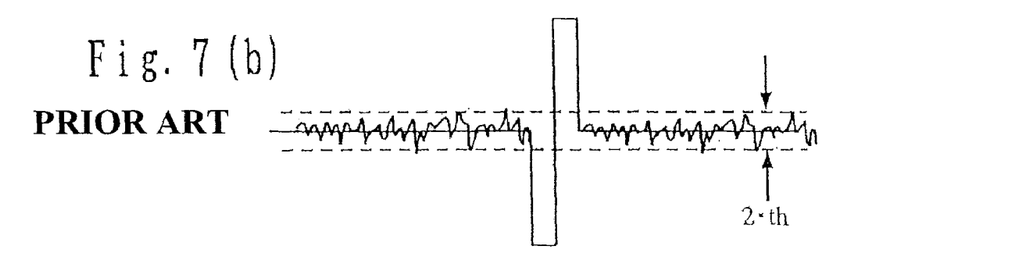

$Z_{-1}$ represents a delay of one pixel in the horizontal direction. On the assumption that input to the detail extracting section 9 is a signal indicated in FIG. 7(a) the vertical HPF 13 and the horizontal HPF 14 have outputs where high frequency components are extracted as shown in FIG. 7(b). At this point of time, noise in a signal generally contains a large number of high frequency components and thus noise contained in input to the detail extracting section 9 is also mixed with the outputs of the vertical HPF 13 and the horizontal HPF 14.

In gain adjusting sections 15-1 and 15-2, the outputs of the vertical HPF 13 and the horizontal HPF 14 are each multiplied by a proper gain.

At this point of time, the outputs of the gain adjusting sections 15-1 and 15-2 also act as signals containing much noise as shown in FIG. 7(b). Hence, coring is performed on such a signal by coring sections 16-1 and 16-2, so that noise is removed.

Figure 7C:
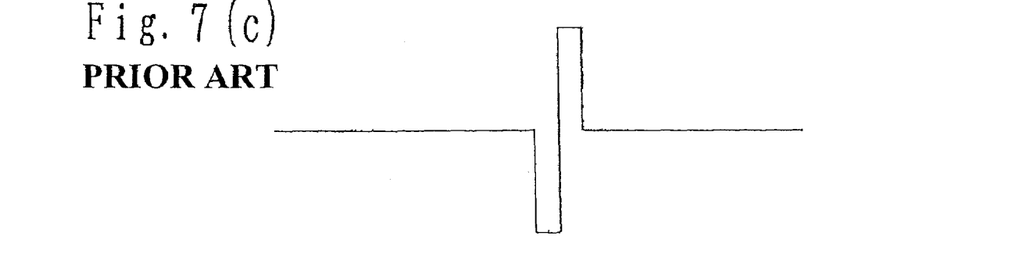
Figure 8:
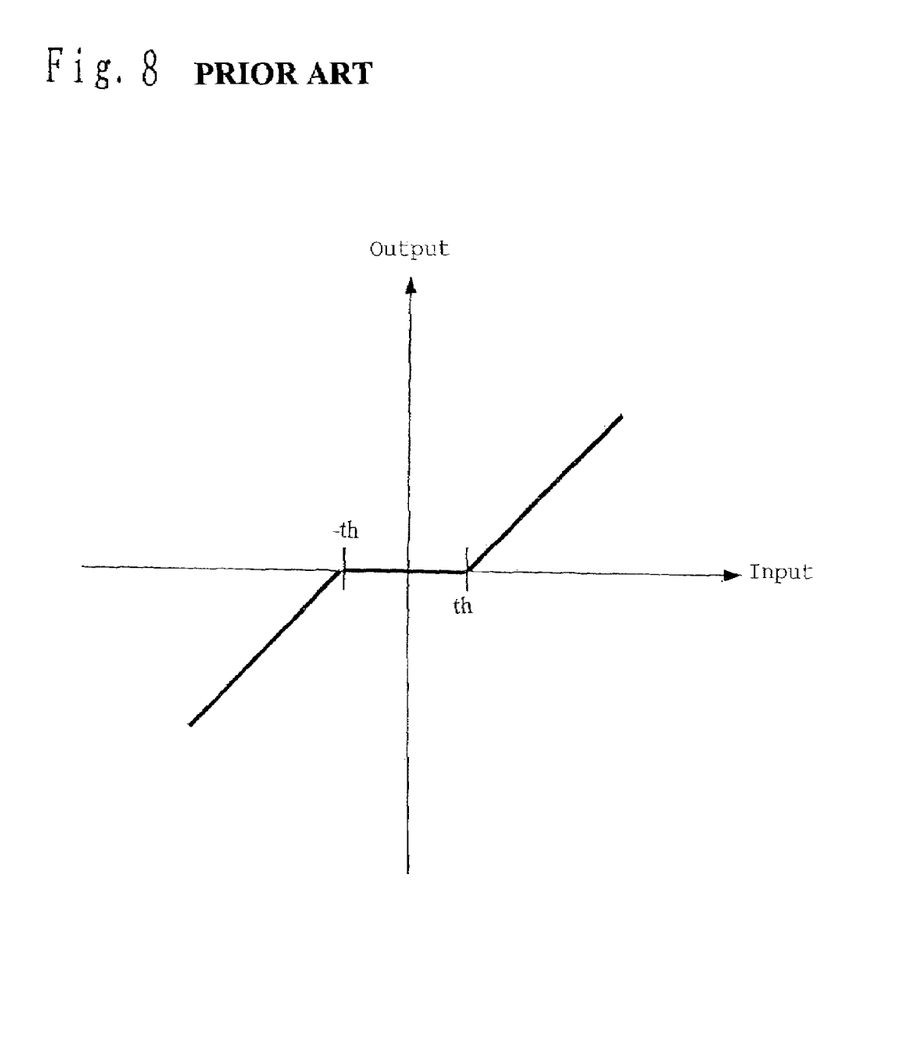
FIG. 8 is a characteristic diagram explaining the operation of coring means.

In the coring sections 16-1 and 16-2, as shown in FIG. 8, a part having an input amplitude equal to or smaller than an equivalence th is set at 0 with respect to the outputs of the gain adjusting sections 15-1 and 15-2. The equivalence is subtracted from an input exceeding the equivalence and then output is made. Thus, noise is removed from the output waveforms of the coring sections 16-1 and 16-2 as shown in FIG. 7(c).

In an adding section 17, the output signals of the coring sections 16-1 and 16-2 are added to obtain a two-dimensional high-frequency component.

Figure 7D:
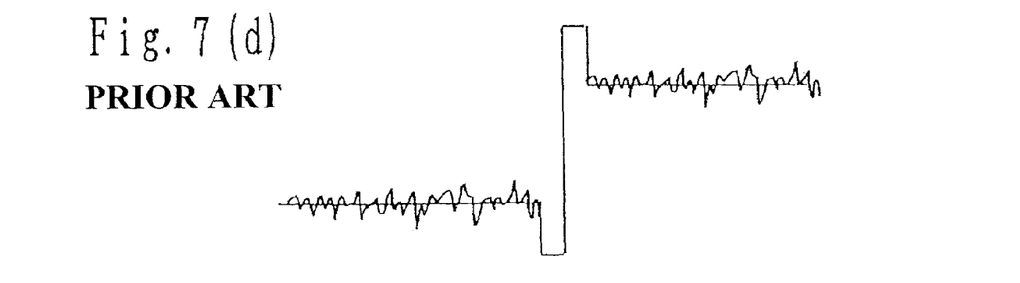

Referring to FIG. 5 again, in the adding section 10, high frequency components are supplemented by adding the output of the detail extracting section 9 to the output of first matrix means, detail is enhanced as shown in FIG. 7(d), and thus a signal with a high resolution is obtained, though an S/N is somewhat degraded.

Figure 9:
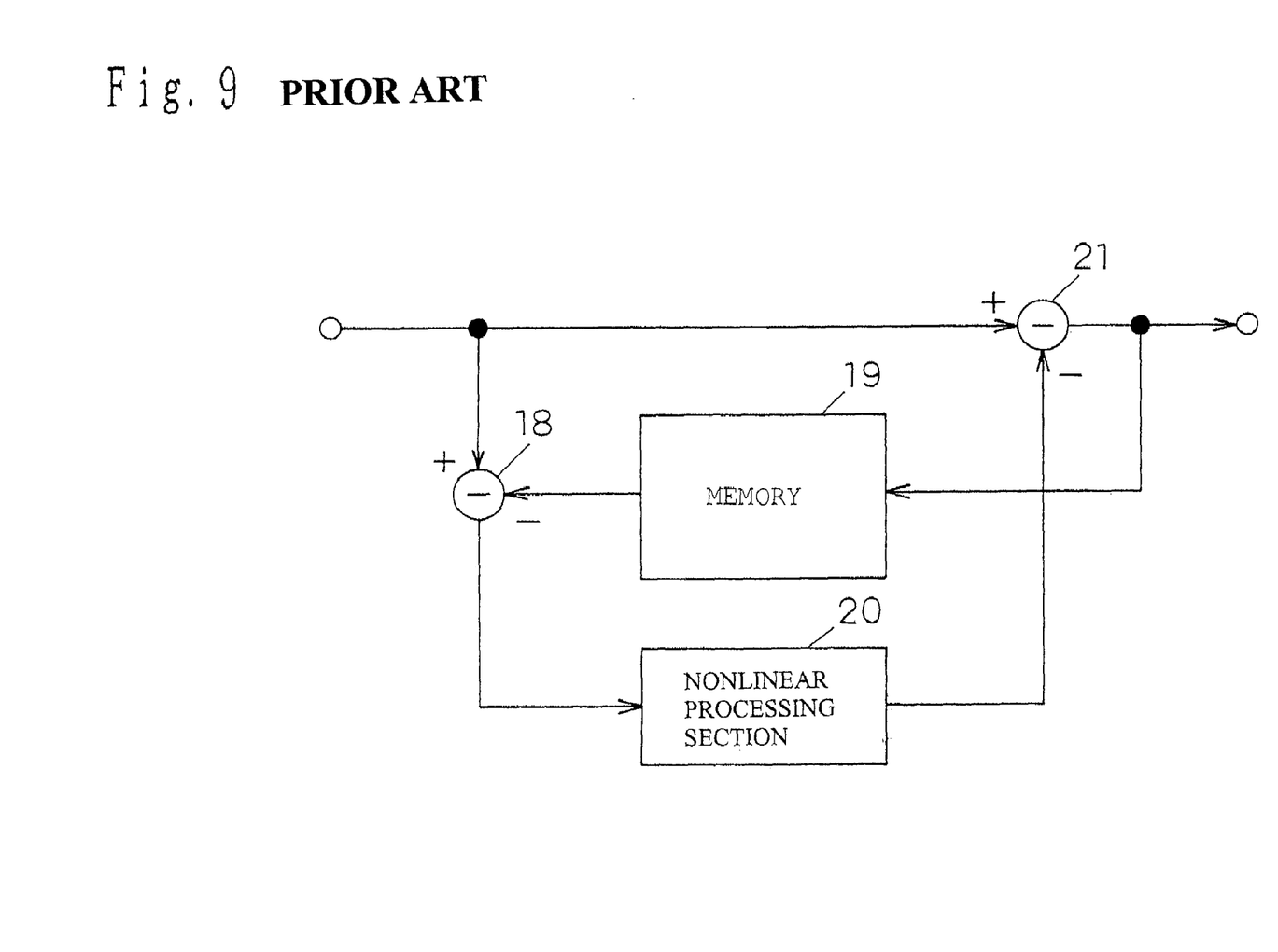
FIG. 9 is a block diagram showing the configuration of a recursive noise reduction circuit.

Subsequently in a three-dimensional NR (Noise Reduction) 6, field recursive noise reduction is performed on the output of the adding section 10 in the time direction. The field recursive noise reduction will be described below. FIG. 9 shows a structural example of the three-dimensional NR. In a first subtracting section 18, the output of a memory 19 is subtracted from an input signal.

In this configuration, on the assumption that the memory 19 provides a delay of 1V (V: vertical scanning period which is 1/59.94 sec in the NTSC), the output of the first subtracting section 18 has a difference of video signals in two successive fields and thus a change (movement) and noise of a video signal of the 1V period is contained.

Figure 10:
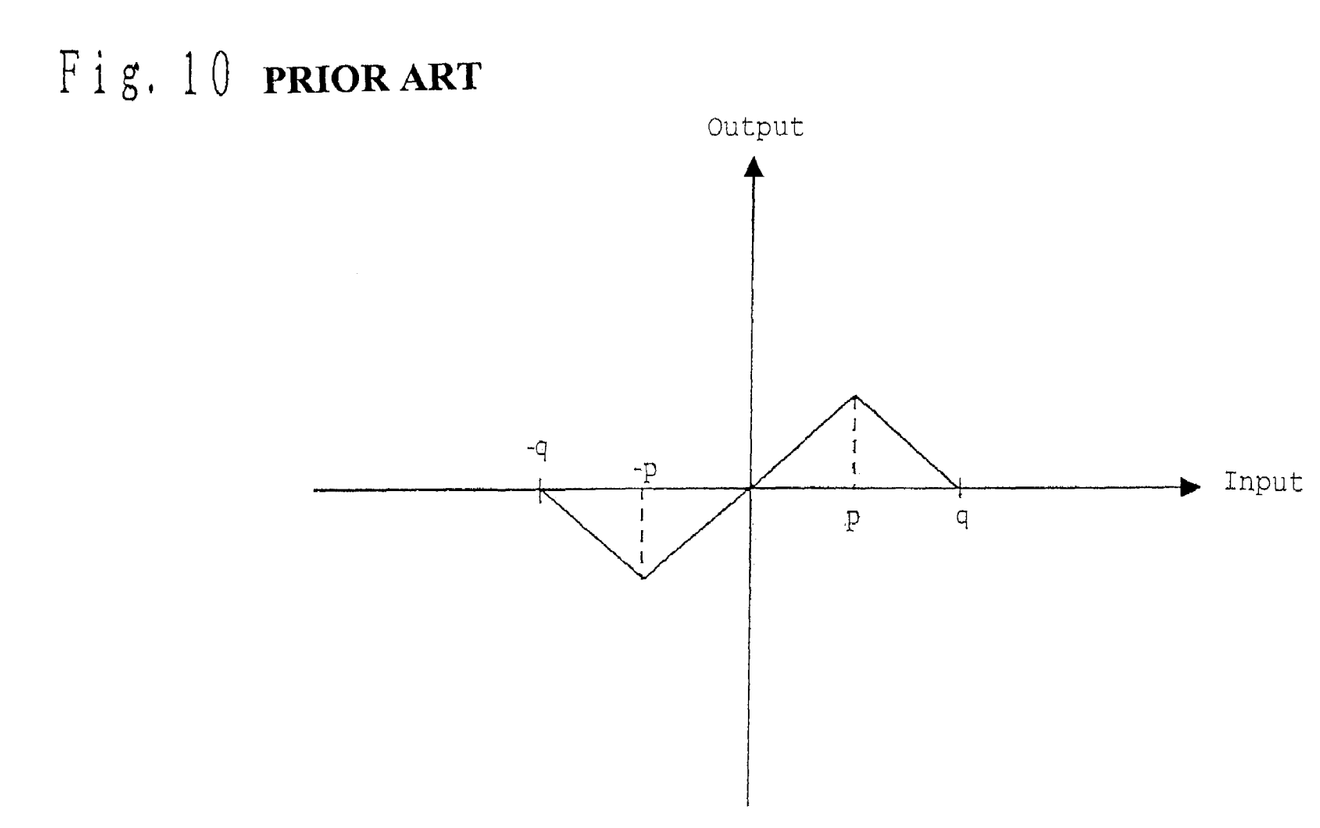
FIG. 10 is a characteristic diagram showing the input/output characteristics of a nonlinear circuit in the recursive noise reduction circuit.

In a nonlinear processing section 20, noise is extracted from the output of the first subtracting section 18. Under a general idea of noise being smaller in amplitude than a signal, when the amplitude of an input signal has an absolute value smaller than a threshold value p as shown in FIG. 10, an input is outputted as it is, and an output amplitude is reduced as an absolute value of the amplitude of an input signal becomes larger than the threshold value p. Thus, noise can be extracted from the input signal. Additionally, in the example of FIG. 10, when the amplitude of the input signal has an absolute value equal to or higher than a threshold value q ($|q|>|P|$), the input is not outputted.

In a second subtracting section 21, the output of the nonlinear processing section 20 is subtracted from the input signal. As a result, the output of the second subtracting section 21 obtains video signal output from which noise is reduced.

The following will describe the relationship between the threshold value p of the nonlinear processing section 20 and noise amplitude. Noise having an amplitude equal to or smaller than the threshold value p passes through the nonlinear processing section 20 and is subtracted from the input signal in the second subtracting section 21, so that noise can be almost completely removed. On the other hand, noise having an amplitude exceeding the threshold value p is attenuated in the nonlinear processing section 20. Thus, even when a subtraction is made from the input signal in the second subtracting section 21, noise cannot be completely removed but partially or totally remains.

The output of the second subtracting section 21 is also inputted simultaneously to a field memory 19 and is used to perform an operation for an input signal after 1V. The output of the three-dimensional NR 6 acts as the output of a camera luminance signal.

The conventional imaging apparatus reduces noise in the above-described manner.

However, the imaging apparatus configured thus has the following problem: when the detail gain of the detail extracting section 9 is increased or the equivalence th of the coring sections 16-1 and 16-2 is reduced in order to increase a resolution, noise amplitude increases in the output of the adding section 10, degrading S/N.

In contrast, when the degradation of S/N is corrected by the three-dimensional NR 6, it is necessary to increase the equivalence p of the nonlinear processing section 20. When the equivalence p is increased, a change of a signal is also contained in the output of the nonlinear processing section 20. Thus, the output of the second subtracting section 21 causes a serious degradation of an afterimage. Moreover, when the equivalence th of the coring sections 16-1 and 16-2 is increased, the detail with a small amplitude disappears, resulting in an entirely blurred image, though S/N is improved.

DISCLOSURE OF THE INVENTION

The present invention is devised to solve the above-described problems and achieves an imaging apparatus in which S/N degradation is minimized while maintaining a high resolution.

A first aspect of the invention is an imaging apparatus, comprising:
 imaging means,
 gain adjusting means of adjusting a gain of an output signal of the imaging means,
 smoothing means of performing smoothing on an output signal of the gain adjusting means,
 selecting means of selecting and outputting either an output signal of the gain adjusting means or an output signal of the smoothing means according to a magnitude of the gain of the gain adjusting means,
 noise reducing means of performing recursive noise reduction on an output signal of the selecting means, and
 detail enhancing means of enhancing a two-dimensional high-frequency component of an output signal of the noise reducing means,
 wherein the selecting means performs selection so that the output signal of the gain adjusting means is caused to serve as an input to the noise reducing means when the gain adjusting means has again equal to or lower than a predetermined value and the output signal of the smoothing means is caused to serve as an input to the noise reducing means when the gain adjusting means has a gain exceeding the predetermined value.

Further, a second aspect of the invention is an imaging apparatus, comprising:
 imaging means,
 gain adjusting means of adjusting a gain of the output signal of the imaging means,
 smoothing means of performing smoothing on the output signal of the gain adjusting means,
 selecting means of selecting and outputting either the output signal of the gain adjusting means or the output signal of the smoothing means according to an illumination of an environment where an image is taken by the imaging means,
 noise reducing means of performing recursive noise reduction on the output signal of the selecting means, and
 detail enhancing means of enhancing two-dimensional high-frequency components of the output signal of the noise reducing means,
 wherein the selecting means performs selection so that the output signal of the gain adjusting means is caused to serve as an input to the noise reducing means when the environment has a high illumination and the output signal of the smoothing means is caused to serve as an input to the noise reducing means when the environment has a low illumination.

A third aspect of the invention is the imaging apparatus according to the first aspect of the invention, wherein the imaging means has three image pickup devices, and
 the detail enhancing means has first and second matrix means of each performing matrix processing with a different parameter on the output signal of the noise reducing means,
 detail extracting means of extracting the two-dimensional high-frequency component from an output signal of the second matrix means, and
 adding means of adding an output signal of the first matrix means and an output signal of the detail extracting means.

Further, a fourth aspect of the invention is the imaging apparatus of the first or second aspect of the invention, wherein the imaging means has a single image pickup device, and
 the detail enhancing means comprises third matrix means of performing matrix processing on the output signal of the noise reducing means, and
 detail extracting means of extracting a two-dimensional high-frequency component from the output signal of the third matrix means.

A fifth aspect of the invention is the imaging apparatus according to the second aspect of the invention, wherein the smoothing means is a low-pass filter (LPF).

A sixth aspect of the invention is the imaging apparatus according to the third aspect of the invention, wherein the smoothing means is a median filter.

A seventh aspect of the invention is the imaging apparatus according to the fourth aspect of the invention, wherein the recursive noise reducing means is three-dimensional noise reduction (NR).

Moreover, an eighth aspect of the invention is an imaging method, comprising:

an imaging step, a gain adjusting step of adjusting a gain of the output signal of the imaging step, a smoothing step of performing smoothing on the output signal of the gain adjusting step, a selecting step of selecting and outputting either the output signal of the gain adjusting step or the output signal of the smoothing step according to the magnitude of the gain of the gain adjusting step, a noise reducing step of performing recursive noise reduction on the output signal of the selecting step, and a detail enhancing step of enhancing two-dimensional high-frequency components of the output signal of the noise reducing step, wherein the selecting step performs selection so that the output signal of the gain adjusting step is caused to serve as an input to the noise reducing step when the gain adjusting step has a gain equal to or lower than a predetermined value and the output signal of the smoothing step is caused to serve as an input to the noise reducing step when the gain adjusting step has a gain exceeding the predetermined value.

A ninth invention is an imaging method, comprising:

an imaging step, a gain adjusting step of adjusting a gain of the output signal of the imaging step, a smoothing step of performing smoothing on the output signal of the gain adjusting step, a selecting step of selecting and outputting either the output signal of the gain adjusting step or the output signal of the smoothing step according to an illumination of an environment where an image is taken by the imaging means, a noise reducing step of performing recursive noise reduction on the output signal of the selecting step, and a detail enhancing step of enhancing two-dimensional high-frequency components of the output signal of the noise reducing step, wherein the selecting step performs selection so that the output signal of the gain adjusting step is caused to serve as an input to the noise reducing step when the environment has a high illumination and the output signal of the smoothing step is caused to serve as an input to the noise reducing means when the environment has a low illumination.

A tenth aspect of the invention is a program of causing a computer to act as the gain adjusting means of adjusting a gain of the output signal of the imaging means and act as the selecting means of selecting and outputting either the output signal of the gain adjusting means or the output signal of the smoothing means according to a magnitude of the gain of the gain adjusting means, in the imaging apparatus of the first aspect of the invention.

Also, an eleventh aspect of the invention is a program of causing a computer to act as the gain adjusting means of adjusting a gain of the output signal of the imaging means and act as the selecting means of selecting and outputting either the output signal of the gain adjusting means or the output signal of the smoothing means according to an illumination of an environment where an image is taken by the imaging means, in the imaging apparatus of the second aspect of the invention.

A twelfth aspect of the invention is a recording medium of recording the program of the sixth aspect of the invention, the recording medium being readable by a computer.

DESCRIPTION OF THE SYMBOLS

1 CCD
2 gain control section
3 LPF
4 selecting section
4a control section
6 three-dimensional NR
7 first matrix
8 second matrix
9 detail extracting section
10 adding section

BEST MODE FOR CARRYING OUT THE INVENTION

The following will describe the embodiment of the present invention in accordance with the accompanying drawings.

EMBODIMENT 1

Figure 1:
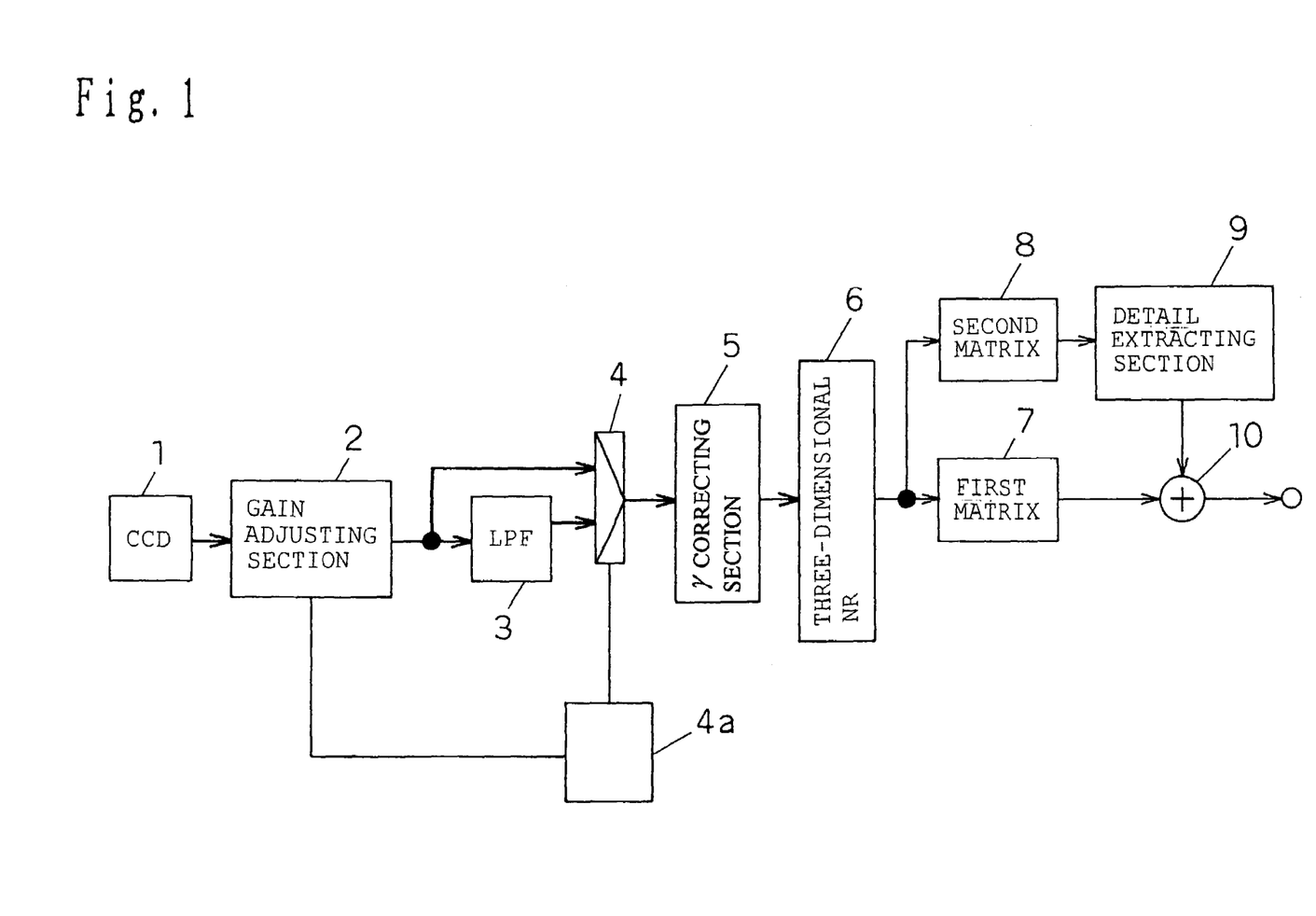
FIG. 1 is a block diagram showing an embodiment of an imaging apparatus according to the present invention.

FIG. 1 is a block diagram showing the embodiment of the present invention. FIG. 1 shows an example of a 3CCD camera. Three RGB systems are present between CCD 1, which is constituted of three CCDs, and three-dimensional NR 6. To simplify the drawing, thick arrows represent RGB signals and thin arrows represent luminance signals in FIG. 1.

In FIG. 1, reference numeral 1 denotes the CCD serving as an example of the imaging means of the present invention. The imaging means converts an incident optical signal of a subject into an electric signal and outputs the signal. Reference numeral 2 denotes a gain adjusting section serving as an example of the gain adjusting means of the present invention. The gain adjusting means performs gain adjustment on an output signal from the CCD 1. Reference numeral 3 denotes a low-pass filter (hereinafter abbreviated as an LPF) serving as an example of the smoothing means of the present invention. The smoothing means performs smoothing on an output signal from the gain adjustment section 2. Reference numeral 4 denotes a selecting section which selects and outputs an output signal from either the gain adjusting section 2 or the LPF 3. Reference numeral 4a denotes a control section which controls the selecting section 4 based on the magnitude of a gain adjusted by the gain adjusting section 2. Besides, the selecting section 4 and the control section 4a constitute the selecting means of the present invention.

Reference numeral 5 denotes a γ correcting section which performs γ correction such as tone correction on the output signal of the selecting section 4. Reference numeral 6 denotes a three-dimensional noise reduction circuit (hereinafter abbreviated as a three-dimensional NR) serving as an example of the field recursive noise reducing means of the present invention. The recursive noise reducing means performs field recursive noise reduction on the output signal of the γ correcting section 5. Besides, in the present embodiment, the output signal of the γ correcting section 45 is subjected to noise reduction in the three-dimensional NR 6. It is not always necessary to provide the γ correcting section 5 between the selecting section 4 and the three-dimensional NR 6. The γ correcting section 5 may be omitted and the output signal of the selecting section 4 may be inputted to the three-dimensional NR 6.

Reference numerals 7 and 8 denote first and second matrix circuits (hereinafter referred to as first and second matrices) serving as examples of the first and second matrix means of the present invention. The first and second matrix means perform matrix processing on the output signal of the three-dimensional NR 6. Reference numeral 9 denotes a detail extracting section serving as an example of the detail extracting means of the present invention. The detail extracting means extracts a two-dimensional high-frequency component from the output signal of the second matrix 8. Reference numeral 10 denotes an adding section serving as an example of the adding means of the present invention. The adding means adds the output signal of the first matrix 7 and the output signal of the detail extracting section 9. The output signal of the adding section 10 serves as the output signal of the apparatus. The first matrix 7, the second matrix 8, the detail extracting section 9, and the adding section 10 constitute the detail enhancing means of the present invention.

Regarding the imaging apparatus configured thus according to the present embodiment, operations will be described below. The following will also discuss an embodiment of an imaging method according to the present invention.

An RGB signal outputted from the CCD 1 is subjected to signal level adjustment in the gain adjusting section 2 according to a subject condition. In the LPF (Low pass Filter) 3, one-dimensional or two-dimensional LPF processing is performed.

Figure 2:
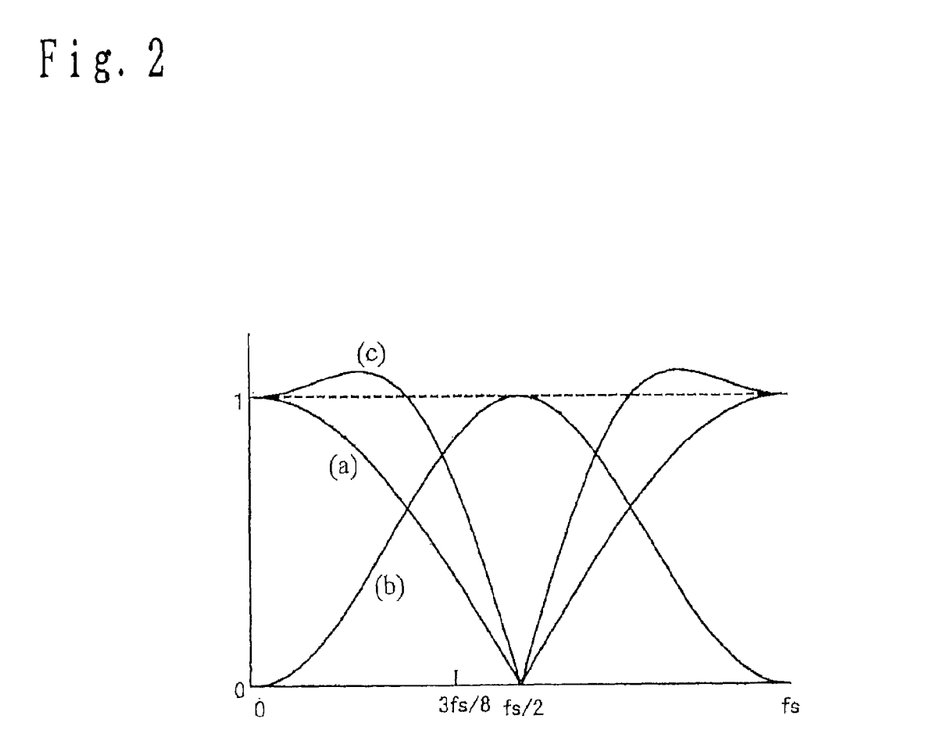
FIG. 2 is a characteristic diagram showing the frequency characteristics of an LPF, detail extracting means, and an overall system according to the embodiment.

The LPF processing will be described below. For simple explanation, a horizontal LPF will be discussed as an example. In the case of an LPF having a transfer function of (Formula 5), the LPF has a frequency characteristic shown in curve (a) in FIG. 2.

$$LPF=(1+Z^{-1})/2 \quad \text{(Formula 5)}$$

In (Formula 5), $Z^{-1}$ represents a delay of one pixel in the horizontal direction. In FIG. 2, fs represents a sampling frequency in the horizontal or vertical direction. As is evident from curve (a) in FIG. 2, in the frequency characteristic of the LPF 3, high frequency components are greatly attenuated. Hence, the high frequency components of a signal and noise containing a large number of high-frequency components are greatly attenuated. On the other hand, medium and low frequency components in the signal and noise containing a large number of medium and low frequency components pass through the LPF 3 without attenuation. Noise of all the frequency components contained in the signal is attenuated by the noise of high-frequency components, thereby improving S/N. When the noise is random noise, the degree of improvement in S/N is about 3 dB. The vertical LPF is completely similar to the horizontal LPF except that a pixel is delayed in (Formula 5) by one pixel in the vertical direction.

In the selecting section 4, either the output signal of the gain adjusting section 2 or the output signal of the LPF 3 is selected and outputted. The output of the selecting section 4 is subjected to tone correction in the γ correcting section 5 and is inputted to the three-dimensional NR 6.

In the three-dimensional NR 6, field recursive noise reduction is performed on the output signal of the γ correcting section 5. The internal operation of the three-dimensional NR 6 is completely the same as the conventional art shown in FIGS. 9 and 10 and thus the detailed explanation is omitted. The influence exerted by the LPF 3 of the previous stage on the three-dimensional NR 6 will be discussed below.

As described above, regarding the output signal of the LPF 3, high-frequency components of the signal and noise containing a large number of high frequency components are both low in amplitude. When an image is taken at a low illumination as a subject condition, a signal having high frequency components is lower in amplitude in comparison with a signal having other frequency components. Thus, in the input to a nonlinear processing section 20 in the three-dimensional NR 6, noise amplitude is low compared with the amplitude of all the frequency components of an inputted signal.

Hence, noise having originally remained due to an amplitude exceeding a threshold value p passes through the LPF 3 and thus the noise has an amplitude of the threshold value p or lower, so that the noise can be completely removed. Consequently, the effect of the three-dimensional NR is further enhanced.

Then, in the first matrix 7, a first luminance signal Y is determined from RGB by the operation of (Formula 1). Similarly in the second matrix 8, a second luminance signal Y' is determined from RGB by the operation of (Formula 2). The reason why Y' is determined in addition to γ is that a loop is canceled as with the conventional art when a spatial pixel shift method is used.

The detail extracting section 9 extracts two-dimensional high-frequency components from the output of the second matrix 8 according to the operations of (Formula 3) and (Formula 4). Curve (b) FIG. 2 shows the frequency characteristic. In curve (b) in FIG. 2, fs represents a horizontal or vertical sampling frequency. The internal configuration and operation of the detail extracting section 9 are completely the same as the conventional art shown in FIGS. 6 and 7 and thus the explanation thereof is omitted. However, the state of the internal signal is completely different. Referring to FIGS. 3(a)-(d) and 6, the following will describe the relationship between an S/N of an input signal and detail extraction.

Figure 3A:
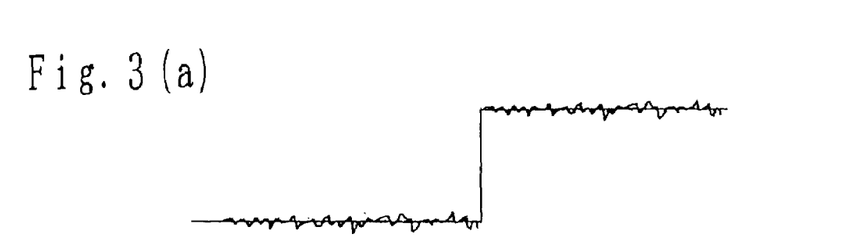
FIGS. 3(a)-(d) are schematic diagrams explaining operations performed in the detail extracting means in the imaging apparatus of the present invention.
Figure 3B:
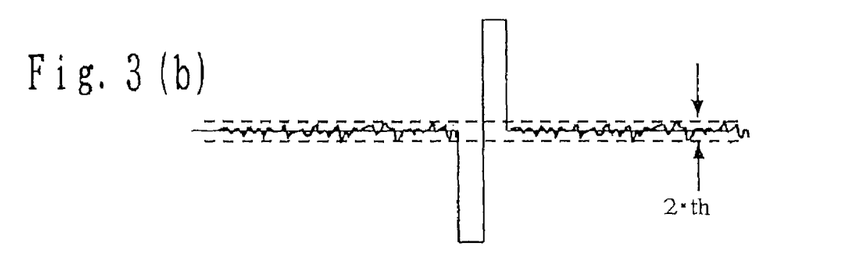
Figure 3C:
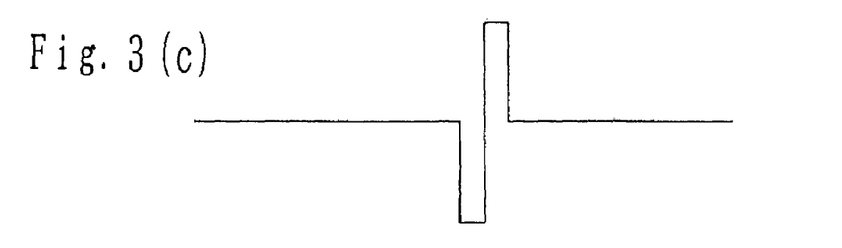
Figure 3D:
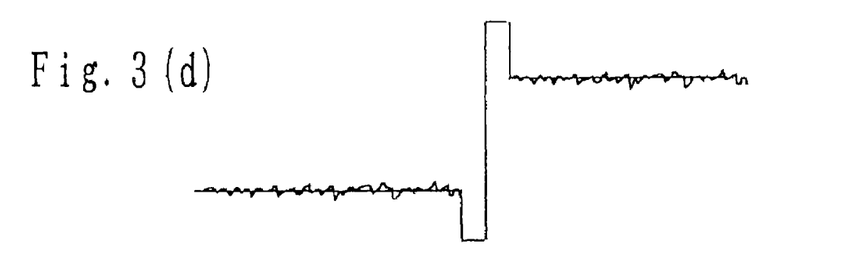

FIGS. 3(a)-(d) shows the waveforms of signals in the detail extracting section 9. As described above, in coring sections 16-1 and 16-2 in the detail extracting section 9, noise contained in high frequency components is removed but noise remains with an amplitude of an absolute value larger than a threshold value th. However, when noise with high frequency components is removed in the LPF 3 of the previous stage and S/N is improved in the three-dimensional NR 6 to reduce noise of all the frequency components, as shown in FIG. 3(a) the level of noise contained in an input signal becomes lower than that of FIG. 7(a). Thus, as shown in FIG. 3(b), the coring threshold th can be set smaller than the example of FIG. 7(b). Moreover, the detail gain of gain adjusting sections 15-1 and 15-2 can be set larger. As shown in FIG. 3(d), it is possible to enhance the detail while hardly degrading S/N.

The following will describe compensation for a resolution which is degraded by the passage through the LPF 3. As described above, the LPF 3 has a frequency characteristic shown in curve (a) in FIG. 2. The detail extracting section 9 has a frequency characteristic shown in curve (b) in FIG. 2. Further, the system of the present embodiment has an overall frequency characteristic shown in curve (c) in FIG. 2. Incidentally, the characteristic of curve (c) in FIG. 2 is obtained when the gain of the gain adjusting sections 15-1 and 15-2 is set at one time. As is evident from curve (c) in FIG. 2, the frequency characteristic degraded by the LPF 3 (curve (a) in FIG. 2) is greatly restored by detail enhancement, increasing the resolution of an image.

Figure 4:
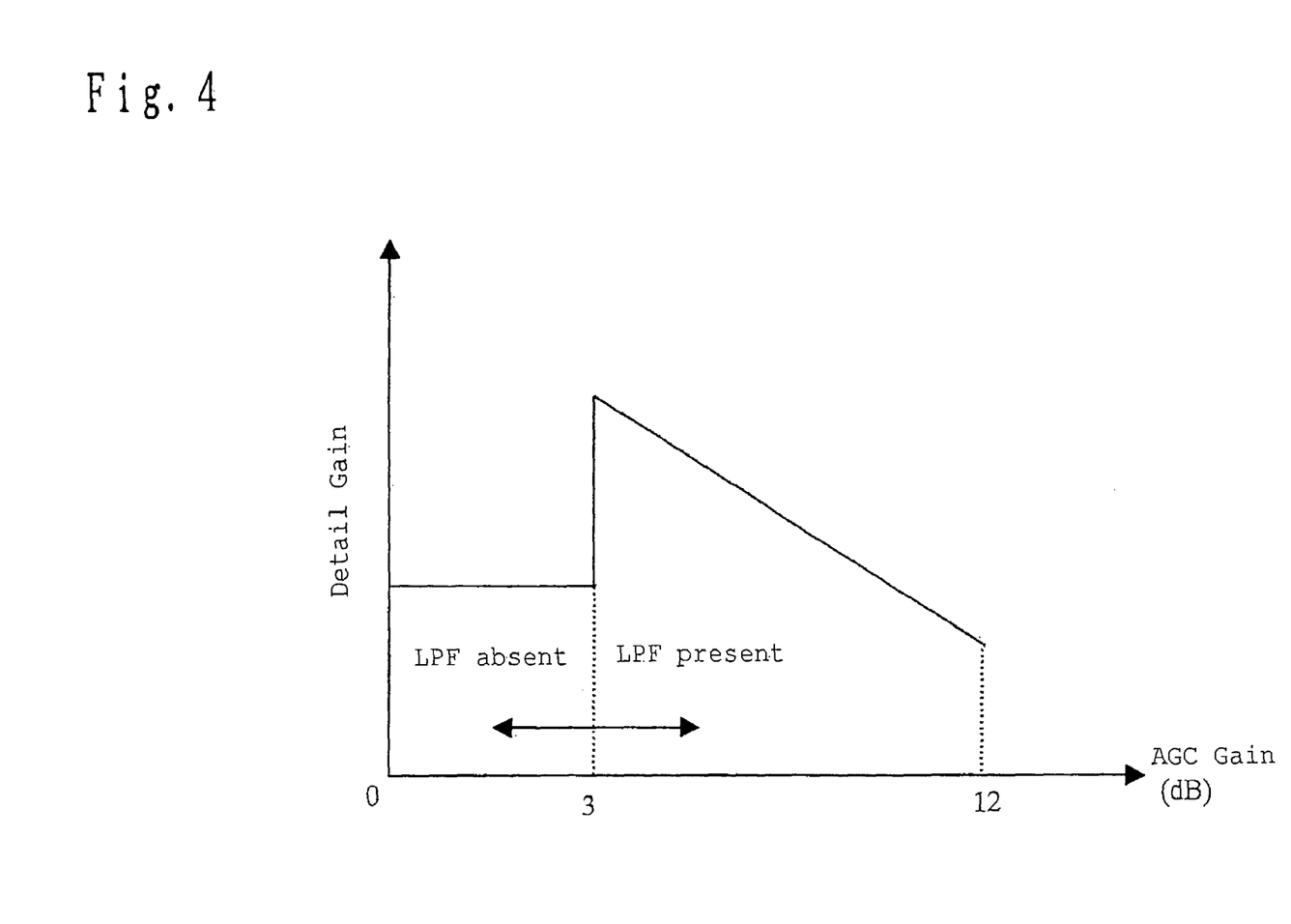
FIG. 4 is a characteristic diagram showing the AGC gain control characteristic versus detail gain according to the embodiment.

Referring to FIG. 4, a controlling method for an actual imaging condition will be described below by using the above-described configuration. FIG. 4 is a graph showing the relationship between the AGC gain of the gain adjusting section 2 and the detail gain of the gain adjusting sections 15-1 and 15-2 in the detail extracting section 9. As shown in FIG. 4, when the gain adjusting section 2 has an AGC gain of 0 to 3 dB (high illumination), a signal originally has a high S/N. Thus, the control section 4a controls the selecting section 4 to select the output signal of the gain adjusting section 2. On the other hand, when the AGC gain of the gain adjusting section 2 exceeds 3 dB (low illumination), a signal has a low S/N. Thus, the control section 4a controls the selecting section 4 to select the output signal of the LPF 3. At the same time, in order to compensate for a degraded frequency characteristic, control is performed so as to increase the gains of the gain adjusting sections 15-1 and 15-2 in the detail extracting section 9. Hence, as shown in FIG. 4, the detail gain is increased when the AGC gain is 3 dB, thereby compensating for picture quality declining due to the degraded frequency characteristic. Moreover, when the AGC gain exceeds 3 dB, the noise level also increases. Hence, by reducing the detain gain, it is possible to prevent the noise level from increasing with the AGC gain. Besides, in the above explanation, the control section 4a controls selection according to the AGC gain of the gain adjusting section 2. The control section 4a may acquire, from the CCD 1, an illumination of an imaging environment in an actual imaging condition, and selection may be controlled according to the illumination.

As described above, in the embodiment, the LPF 3 is disposed before the three-dimensional NR 6 and the detail extracting section 9 is disposed after the three-dimensional NR 6, so that the effect of noise reduction in the three-dimensional NR 6 is further enhanced and a signal inputted to the detail extracting section 9 is increased in S/N. Thus, it is possible to minimize a degradation in S/N in detail enhancement, thereby providing an imaging apparatus with a high S/N while maintaining a high resolution even under poor conditions such as a low illumination. Further, even at a low illumination, it is possible to improve an S/N while hardly degrading the frequency characteristic of a signal.

Further, the processing of the noise reducing means was explained as field recursive processing, in which reference is made to a signal before 1V and arithmetic is performed. The processing may be explained as line recursive processing, in which reference is made to a signal before 1H and arithmetic is performed, or frame recursive processing, in which reference is made to a signal before 2V and arithmetic is performed.

The line recursive processing is characterized in that although vertical detail is degraded, an afterimage is not degraded in principle and only a memory capacity of 1H is necessary. In the case of frame recursive processing, although an afterimage is considerably degraded with respect to the movement of a subject and a memory capacity is doubled, vertical detail is not degraded on a static part.

Further, for convenience of explanation, the transfer functions of the detail extracting section 9 and the LPF 3 were expressed by (Formula 3) to (Formula 5). The transfer functions are not particularly limited.

Moreover, although the LPF 3 was used as the smoothing means of the present invention, a median filter is also applicable. In short, any filter is applicable as long as the high frequency components of a signal are suppressed.

Additionally, the operation of the second matrix means was expressed by (Formula 2). The operation may be expressed by (Formula 1).

Further, the above explanation described that the selecting section 4 is controlled from the time when the AGC gain is 3 dB. The AGC gain is not limited to 3 dB and thus control may be performed at a given value.

Figure 11:
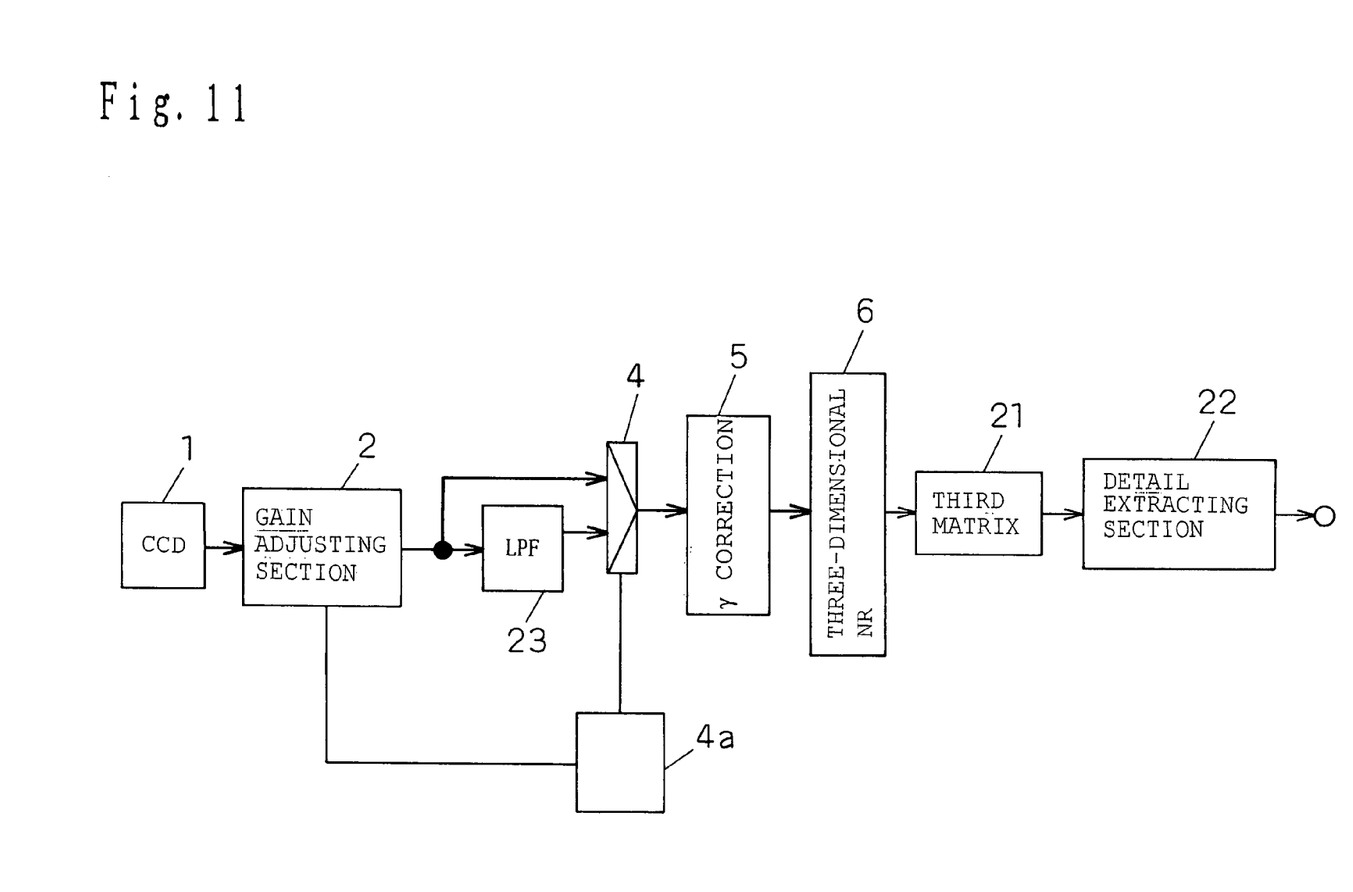
FIG. 11 is a block diagram showing another structural example according to the embodiment of the imaging apparatus of the present invention.

Moreover, the above explanation described that the imaging apparatus of the present embodiment is a 3CCD camera having three image pickup devices of R, G, and B. A 1CCD camera is also applicable in which a CCD 1 has a single image pickup device. This configuration is shown in FIG. 11. As shown in FIG. 11, the structural example comprises a third matrix circuit, which serves as an example of the third matrix means of the present invention, and a detail extracting section 22 of extracting a two-dimensional high-frequency component from the output signal of the matrix circuit. A median filter 23 is used instead of the LPF 3. The other configurations are similar to those of FIG. 1.

Further, the program of the present invention is a program of causing a computer to execute the functions of some means of the imaging apparatus according to the present invention. A program operating in synchronization with the computer is also applicable.

Moreover, the present invention is a medium including programs of causing a computer to execute all or some functions of some means of the imaging apparatus according to the present invention. Another medium is also applicable which is readable by a computer and causes the read program to execute the functions in synchronization with the computer.

Additionally, "some means" of the present invention indicate some of a plurality of means or some functions of one means.

Further, a recording medium which records the programs of the present invention and is readable by a computer is also included in the present invention.

Moreover, one embodiment of the program according to the present invention may be recorded in a recording medium readable by a computer and may be operated in synchronization with the computer.

Further, another embodiment of the program according to the present invention maybe transmitted through a transmission medium, read by a computer, and operated in synchronization with the computer.

Besides, the data structure of the present invention includes a database, a data format, a data table, a data list, and a data type.

Moreover, the recording medium includes a ROM. The transmission medium includes a transmission mechanism such as the Internet, light, a radio wave, and a sound wave.

Additionally, the computer of the present invention is not limited to simple hardware such as a CPU but also includes firmware, an OS, and peripheral devices.

As described above, the configuration of the present invention may be realized as software and hardware.

INDUSTRIAL APPLICABILITY

As described above, the present invention can achieve an imaging apparatus with a high S/N while maintaining a high resolution even under poor conditions such as a low illumination.

The invention claimed is:

1. An imaging apparatus, comprising:
   imaging means,
   gain adjusting means of adjusting a gain of an output signal of the imaging means,
   smoothing means of performing smoothing on an output signal of the gain adjusting means,
   selecting means of selecting and outputting either an output signal of the gain adjusting means or an output signal of the smoothing means according to a magnitude of the gain of the gain adjusting means,
   noise reducing means of performing recursive noise reduction on an output signal of the selecting means, and
   detail enhancing means of enhancing a two-dimensional high-frequency component of an output signal of the noise reducing means,
   wherein the selecting means performs selection so that the output signal of the gain adjusting means is caused to serve as an input to the noise reducing means when the gain adjusting means has a gain equal to or lower than a predetermined value and the output signal of the smoothing means is caused to serve as an input to the noise reducing means when the gain adjusting means has a gain exceeding the predetermined value.

2. An imaging apparatus, comprising:
   imaging means,
   gain adjusting means of adjusting a gain of the output signal of the imaging means,
   smoothing means of performing smoothing on the output signal of the gain adjusting means,
   selecting means of selecting and outputting either the output signal of the gain adjusting means or the output signal of the smoothing means according to an illumination of an environment where an image is taken by the imaging means,
   noise reducing means of performing recursive noise reduction on the output signal of the selecting means, and
   detail enhancing means of enhancing two-dimensional high-frequency components of the output signal of the noise reducing means,
   wherein the selecting means performs selection so that the output signal of the gain adjusting means is caused to serve as an input to the noise reducing means when the environment has a high illumination and the output signal of the smoothing means is caused to serve as an input to the noise reducing means when the environment has a low illumination.

3. The imaging apparatus according to claim 1 or claim 2, wherein the imaging means has three image pickup devices, and
   the detail enhancing means has first and second matrix means of each performing matrix processing with a different parameter on the output signal of the noise reducing means,
   detail extracting means of extracting the two-dimensional high-frequency component from an output signal of the second matrix means, and
   adding means of adding an output signal of the first matrix means and an output signal of the detail extracting means.

4. The imaging apparatus according to claim 3, wherein the smoothing means is a low-pass filter (LPF).

5. The imaging apparatus according to claim 3, wherein the noise reducing means is three-dimensional noise reduction (NR).

6. The imaging apparatus of claim 1 or claim 2, wherein the imaging means has a single image pickup device, and
   the detail enhancing means comprises third matrix means of performing matrix processing on the output signal of the noise reducing means, and
   detail extracting means of extracting a two-dimensional high-frequency component from the output signal of the third matrix means.

7. The imaging apparatus according to claim 6, wherein the smoothing means is a median filter.

8. An imaging method, comprising:
   an imaging step,
   a gain adjusting step of adjusting a gain of the output signal of the imaging step,
   a smoothing step of performing smoothing on the output signal of the gain adjusting step,
   a selecting step of selecting and outputting either the output signal of the gain adjusting step or the output signal of the smoothing step according to the magnitude of the gain of the gain adjusting step,
   a noise reducing step of performing recursive noise reduction on the output signal of the selecting step, and
   a detail enhancing step of enhancing two-dimensional high-frequency components of the output signal of the noise reducing step,
   wherein the selecting step performs selection so that the output signal of the gain adjusting step is caused to serve as an input to the noise reducing step when the gain adjusting step has a gain equal to or lower than a predetermined value and the output signal of the smoothing step is caused to serve as an input to the noise reducing step when the gain adjusting step has a gain exceeding the predetermined value.

9. An imaging method, comprising:
   an imaging step,
   a gain adjusting step of adjusting a gain of the output signal of the imaging step,
   a smoothing step of performing smoothing on the output signal of the gain adjusting step, a selecting step of selecting and outputting either the output signal of the gain adjusting step or the output signal of the smoothing step according to an illumination of an environment where an image is taken by the imaging means, a noise reducing step of performing recursive noise reduction on the output signal of the selecting step, and a detail enhancing step of enhancing two-dimensional high-frequency components of the output signal of the noise reducing step, wherein the selecting step performs selection so that the output signal of the gain adjusting step is caused to serve as an input to the noise reducing step when the environment has a high illumination and the output signal of the smoothing step is caused to serve as an input to the noise reducing means when the environment has a low illumination.

10. A program on a computer-readable medium, which program causes a computer to act as the gain adjusting means of adjusting the gain of the output signal of the imaging means and to act as the selecting means of selecting and outputting either the output signal of the gain adjusting means or the output signal of the smoothing means according to the magnitude of the gain of the gain adjusting means, in the imaging apparatus of claim 1.

11. A program on a computer-readable medium, which program causes a computer to act as the gain adjusting means of adjusting the gain of the output signal of the imaging means and to act as the selecting means of selecting and outputting either the output signal of the gain adjusting means or the output signal of the smoothing means according to the illumination of the environment where the image is taken by the imaging means, in the imaging apparatus of claim 2.

12. A computer-readable recording medium of recording the program of claim 10 or claim 11, the computer-readable recording medium being readable by a computer.

* * * * *